(12) United States Patent
Seo et al.

(10) Patent No.: US 7,343,025 B2
(45) Date of Patent: Mar. 11, 2008

(54) METHOD FOR EMBEDDING AND EXTRACTING DIGITAL WATERMARK ON LOWEST WAVELET SUBBAND

(75) Inventors: Yong Seok Seo, Taejon (KR); Sanghyun Joo, Taejon (KR); Seon Hwa Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 763 days.

(21) Appl. No.: 10/734,142

(22) Filed: Dec. 15, 2003

(65) Prior Publication Data

US 2005/0074139 A1 Apr. 7, 2005

(30) Foreign Application Priority Data

Oct. 2, 2003 (KR) .................. 10-2003-0068930

(51) Int. Cl.
G06K 9/00 (2006.01)
G06K 9/64 (2006.01)

(52) U.S. Cl. ..................... 382/100; 382/232
(58) Field of Classification Search ........ 382/100, 382/240, 253, 232, 250; 386/94; 380/253
See application file for complete search history.

(56) References Cited

U.S. PATENT DOCUMENTS

| | | | |
|---|---|---|---|
| 6,301,368 B1 * | 10/2001 | Bolle et al. ................ | 380/100 |
| 6,332,030 B1 * | 12/2001 | Manjunath et al. ......... | 382/100 |
| 6,385,329 B1 * | 5/2002 | Sharma et al. ............. | 382/100 |
| 6,633,654 B2 * | 10/2003 | Hannigan et al. .......... | 382/100 |
| 6,693,965 B1 * | 2/2004 | Inoue et al. ........... | 375/240.19 |
| 6,718,045 B2 * | 4/2004 | Donescu et al. ........... | 382/100 |
| 6,792,129 B1 * | 9/2004 | Zeng et al. ................ | 382/100 |
| 6,934,403 B2 * | 8/2005 | Joo et al. .................. | 382/100 |
| 6,959,101 B2 * | 10/2005 | Yoshiura et al. .......... | 382/100 |
| 7,092,545 B2 * | 8/2006 | Seo et al. .................. | 382/100 |
| 7,302,078 B2 * | 11/2007 | Joo et al. .................. | 382/100 |
| 2003/0095682 A1 * | 5/2003 | Joo et al. .................. | 382/100 |
| 2004/0156528 A1 * | 8/2004 | Joo et al. .................. | 382/100 |

OTHER PUBLICATIONS

Huang et al, Embedding Image Watermarks in DC Components, IEEE Transactions on Circuits and Systems For Video Technology, vol. 10, No. 6, Sep. 2000.*
Joo et al, A New Robust Watermark Embedding into Wavelet DC Components, ETRI Journal, vol. 24, No. 5, Oct. 2002.*

(Continued)

Primary Examiner—Andrae Allison
(74) Attorney, Agent, or Firm—Lowe Hauptman Ham & Berner LLP

(57) ABSTRACT

A for embedding a digital watermark on a wavelet lowest subband includes: setting a DC component region of a multi-stage wavelet-transformed original copy image to a watermark embedment region, and high-frequency filtering an original picture $LL_n$ of the embedment region; generating index information for designating a pixel position, and a watermark sequence to be embedded; calculating an embedment strength $\lambda$ for each position of the watermark embedment region; in case the watermark sequence is sequentially embedded on an embedded position designated by the index information, mutually comparing the original picture $LL_n$ coefficient value for each embedded position with a mirror picture $LL_n{'}$ coefficient value, and then altering the original picture $LL_n$ coefficient value; and in case the original picture $LL_n$ coefficient value is differentiated above a predetermined value with reference to the coffesponding embedment strength $\lambda$, skipping the watermark embedment for the position.

9 Claims, 4 Drawing Sheets

OTHER PUBLICATIONS

Liu et al, An adaptive video watermarking algorithm, Multimedia and Expo, 2001. ICME 2001. IEEE International Conference on Aug. 22-25, 2001 pp. 190-193.*

Mehul, Discrete Wavelet Transform Based Multiple Watermarking Scheme, TENCON 2003. Conference on Convergent Technologies for Asia-Pacific Region Publication Date: Oct. 15-17, 2003, vol. 3, On pp. 935-938 vol. 3.*

Hsieh et al, Hiding Digital Watermarks Using Multiresolution Wavelet Transform, IEEE Transactions on Industrial Electronics, vol. 48, No. 5, Oct. 2001.*

Sanghyun Joo, et al.; "A New Robust Watermark Embedding into Wavele DC Components"; ETRI Journal, vol. 24, No. 5; Oct. 2002; pp. 401-404.

* cited by examiner

METHOD FOR EMBEDDING AND EXTRACTING DIGITAL WATERMARK ON LOWEST WAVELET SUBBAND

BACKGROUND OF THE INVENTION

1. Field of the Invention

The present invention relates to a method for embedding and extracting a digital watermark on a lowest wavelet subband, and more particularly, to a method for embedding and extracting a digital watermark in which when a watermark is embedded on a lowest wavelet band (DC component region), the watermark is embedded depending on an embedment strength $\lambda$ every position considering a human being's visual characteristic and embedment is selectively skipped to prevent screen deterioration such that robustness against an external attack is not only secured, but also a high screen quality watermarking is performed.

2. Description of the Related Art

Due to advent of a recent digital information age, as internet and various networks are widely spread and their related technologies such as data transmission, signal process technology and the like are developed, demand and its commercial value for various digital multimedia data such as audio, image, video and the like are increased. However, since various illegal copy and alteration become popularized along with the increased commercial value and demand, various studies for preventing the illegal copy to protect a copyright for a digital multimedia content are performed.

As such, as an effective method for protecting the digital copyright, a digital watermarking method is proposed. In the digital watermarking method, copyright information is embedded in multimedia data to the degree that a human being is difficult to perceive in visual sense, and when necessary, the copyright information can be extracted to check a copyrighter or a licensor. Accordingly, the watermarking should simultaneously secure invisibility for allowing whether or not the watermark is embedded not to be easily visible, and robustness for allowing to be against an external intended transformation, compression and image process, noise, etc.

However, it is difficult to secure the invisibility in a low frequency region due to a characteristic of a sensitive response of the human being's vision to a component variation of a low frequency than that of a high frequency, and the robustness is generally weaken in a high frequency region.

Accordingly, in the digital watermarking method, it is an important matter that the robustness is not only provided against the external attack or noise, etc., but also the screen deterioration is minimized.

On the other hand, the watermarking method using a conventional wavelet transformation generally employs a method for embedding the watermark on remaining subbands (high frequency region and intermediate frequency region) excepting for an LL subband so as to secure the invisibility.

However, according to a recent appearance of a high compression technology such as JPEG2000, the conventional watermarking method has a drawback in that the robustness is weaken against the high compression, the external intended attack and the like.

Accordingly, it is required to embed the watermark on the DC component region being the lowest wavelet subband, and as a result, in case the watermark is embedded on the LL subband, it is anxiously required to minimize the screen deterioration to secure the invisibility.

SUMMARY OF THE INVENTION

Accordingly, the present invention is directed to a method for embedding and extracting a digital watermark on a lowest wavelet subband that substantially obviates one or more problems due to limitations and disadvantages of the related art.

An object of the present invention is to provide a method for embedding and extracting a digital watermark on a lowest wavelet subband, in which when the watermark is embedded on a lowest wavelet subband $LL_n$ of a wavelet transformation region, an adaptive embedment strength controlling method and a partial embedding-skipping method using modeling of a human being's visual characteristic are not only used to secure a robustness against an external intended attack, a high compression (JPEG2000, etc.) attack, a noise and the like, but also a screen deterioration is minimized to simultaneously secure invisibility.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for embedding a digital watermark on a wavelet lowest subband, the method including: setting a DC component region of a multi-stage wavelet-transformed original copy image to a watermark embedment region, and high-frequency filtering an original picture $LL_n$ of the embedment region to generate a mirror picture $LL_n'$ from which a high frequency component is eliminated; generating index information for designating a pixel position on which the watermark is embedded within the watermark embedment region, and a watermark sequence to be embedded; calculating an embedment strength $\lambda$ for each position of the watermark embedment region considering a variance degree of an original picture $LL_n$ coefficient value; in case the watermark sequence is sequentially embedded on an embedded position designated by the index information, mutually comparing the original picture $LL_n$ coefficient value for each embedded position with a mirror picture $LL_n'$ coefficient value, and then altering the original picture $LL_n$ coefficient value depending on the watermark value with reference to the embedment strength $\lambda$ of a corresponding position to embed the watermark; and in case the original picture $LL_n$ coefficient value altered by watermark embedment is differentiated above a predetermined value with reference to the corresponding embedment strength $\lambda$ in comparison with the coefficient value before altered, skipping the watermark embedment for the position.

In another aspect of the present invention, there is provided a method for embedding a digital watermark on a wavelet lowest subband, the method including: wavelet-transforming a watermark embedded image into the same level as that of the time of watermark embedment and then defining a DC component region as a watermark extracted region, and performing a high-frequency filtering for an original picture $LL_{nE}$ of the extracted region to generate a mirror picture $LL_{nE}'$ from which a high frequency component is eliminated; mutually comparing an original picture coefficient value with a mirror picture coefficient value at each extracted position depending on index information for designating a watermark extracted position to extract a watermark sequence $W_E(i)$; receiving a key value from a user to generate a watermark sequence $W(i)$ of the time of watermark embedment; and determining a similarity between the extracted watermark sequence and the watermark sequence of the time of embedment, and determining whether or not the watermark exists depending on whether or not the similarity is more than a predetermined critical value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
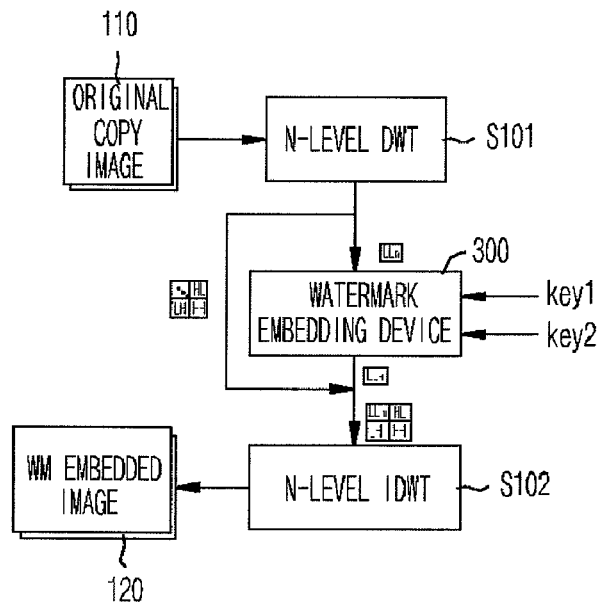
FIG. 1 is a view illustrating a procedure of embedding a watermark on a lowest wavelet subband in accordance with the present invention.

FIG. 1 is a view illustrating a procedure of embedding a watermark on a lowest wavelet subband (DC region) in accordance with the present invention.

Referring to FIG. 1, in the present invention, firstly an original copy image 110 is wavelet-decomposed as many as a desired n-level, and then the watermark is embedded on the DC region being the obtained lowest subband $LL_n$. (S101)

In other words, the present invention can secure robustness against a high-compression external attack such as JPEG-2000 since the watermark is embedded on the lowest subband as described above. Further, in order to minimize a screen deterioration caused by embedding the watermark on the DC region as described above, the present invention controls an embedment strength on every embedded position or executes a selective embedding-skipping.

Accordingly, a size of the DC region should be appropriately set considering a watermark sequence length and embedment strength, a screen deterioration degree, the robustness against the external attack, and the like, and is determined by a wavelet transformation stage number.

Figure 2:
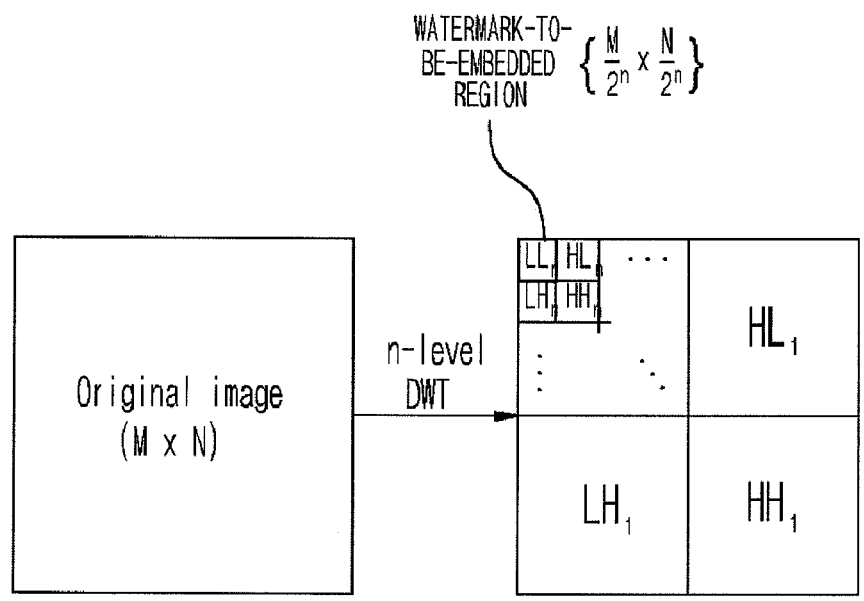
FIG. 2 is a view illustrating a size relation of a wavelet decomposition stage number and a watermark embedment DC region (LL subband)

FIG. 2 is a view illustrating a size relation of the DC region and a wavelet stage number following wavelet decomposition.

As illustrated, in case a M×N sized original copy image is wavelet-decomposed into an n-level, the DC region is sized in $$\frac{M}{2^n} \times \frac{N}{2^n}.$$

As described above, if the original copy image 110 is decomposed into an appropriate n-level depending on the watermark sequence length and the like to determine the size of the DC region, the watermark embedding device 300 embeds the watermark on the $LL_n$ subband being the DC region, and then outputs an $LL_{nE}$ being the DC region after embedment.

At this time, the watermark embedding device 300 determines a watermark data sequence and an embedded position of each watermark according to Key 1 and Key 2 values inputted by a user, and uses a method for controlling the embedment strength depending on each position and a method for embedding-skipping on an excessive screen deterioration position (this will be in detail described below with reference to FIGS. 3 to 5) to alter each wavelet coefficient value of the $LL_n$ subband according to the watermark value.

Further, if the watermark-embedded DC region ($LL_{nE}$ subband) is obtained from the watermark embedding device 300, the obtained DC region is composed with remaining high frequency regions (LH, HL, HH regions) and then is totally inverse-wavelet-transformed into the same n-level such that a watermark-embedded high screen quality image 120 is obtained. (S102)

Figure 3:
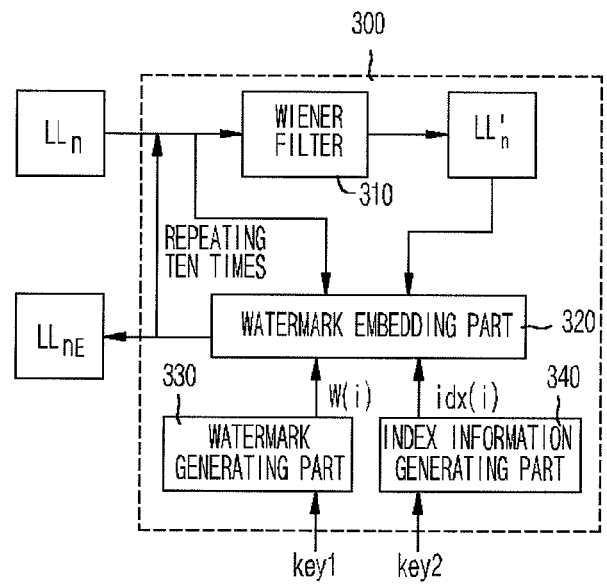
FIG. 3 is a block diagram illustrating a watermark embedding device in accordance with the present invention.
Figure 4:
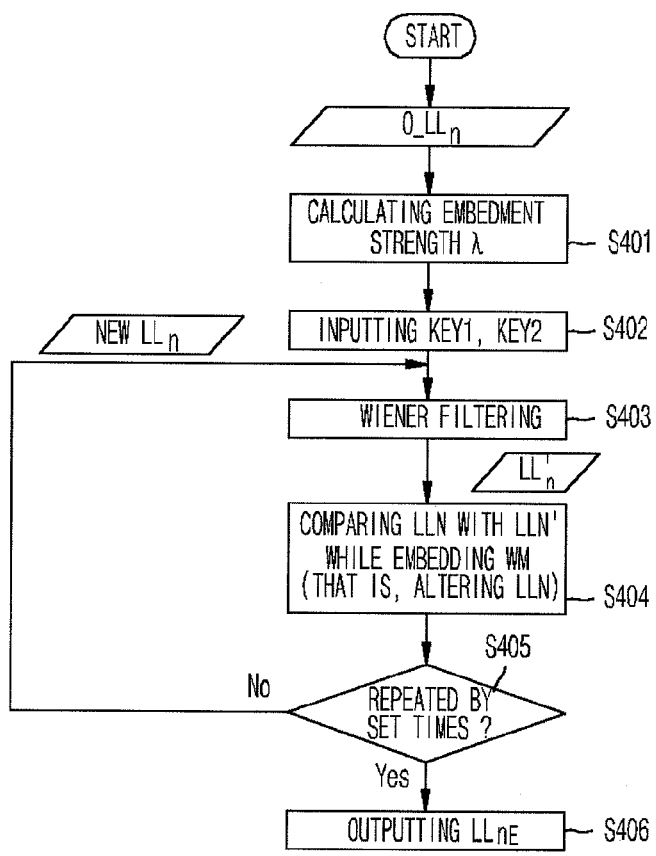
FIG. 4 is a flow chart illustrating a processing procedure in a watermark embedding device of FIG. 3.

On the other hand, FIG. 3 is a block diagram illustrating the watermark embedding device 300, and FIG. 4 is a flow chart illustrating a processing procedure in the watermark embedding device.

Referring to FIG. 3, the watermark embedding device 300 includes a Wiener filter 310, a watermark embedding part 320, an index information generating part 340, and a watermark generating part 330. A unit for the above-described wavelet transformation (setting the embedment region) and wavelet inverse transformation can be also one of structural elements of the watermark embedding device 300.

The Wiener filter 310 being a high frequency eliminating filter eliminates a high frequency component from the $LL_n$ subband being the watermark embedment region to output an $LL_n'$ subband. This is to allow an $LL_n$ coefficient value and its $LL_n'$ coefficient value to be mutually compared with each other on each of the embedded positions to check a high frequency dependency and appropriately alter the $LL_n$ coefficient value according to the high frequency dependency and the watermark value such that screen degradation caused by the watermark embedment is minimized and the robustness is secured against the external attack.

Those having ordinary skill in the art can substitute the Wiener filter 310 with other high-frequency eliminating filters for enabling the high frequency component to be easily eliminated from the wavelet $LL_n$ subband, for another embodiment.

The watermark generating part 330 generates a watermark data sequence $W(i)$ depending on the Key 1 value selected by the user to be provided for the watermark embedding part 320. The watermark data sequence is randomly determined according to the Key 1 value as a random sequence of '1' and '−1'.

The index information generating part 340 generates index information idx(i) according to the Key 2 value arbitrarily inputted by the user to inform the watermark embedding part 320 of information on position on which the watermark is embedded within the $LL_n$ subband. The index information is a random sequence determined depending on the Key 2 value, and is comprised of a binary sequence of '0' and '1'. The sequence length is generated in the same size of the $LL_n$ subband, and the watermark is embedded on a position corresponding to '1'.

The watermark embedding part 320 respectively receives the index information idx(i) and the watermark data sequence W(i), and the $LL_n$ subband coefficient value and its high-frequency-filtered $LL_n'$ coefficient value, and then calculates the embedment strength every position, and mutually compares the $LL_n$ coefficient value with the $LL_n'$ coefficient value for each embedded position depending on the index information to check whether or not a difference of the coefficient values exceeds the embedment strength of a corresponding position and how much degree the $LL_n$ coefficient value is altered. According to a checking result, the $LL_n$ coefficient value is altered or maintained to embed the watermark.

On the other hand, referring to FIG. 4, in the watermark embedding procedure, firstly, the embedment strength λ is calculated for each position of an initially inputted $LL_n$ subband (Hereinafter, referred to as "$O\_LL_n$" representing an original $LL_n$ subband after n-level wavelet transformation that is not Wiener-filtered). (S401)

The embedment strength λ is a value for allowing the difference of the $LL_n$ coefficient value and its filtered $LL_n'$ coefficient value to be maintained above a certain interval. Since the $LL_n$ coefficient value can be transformed due the external attack, the two coefficient values need to be maintained at an enough interval so as to have the robustness against the external attack and exactly extract the watermark. However, in case an interval between the coefficient values is excessively large, since the screen degradation can be heavily generated, the embedment strength should be set to be an appropriate value every position.

In order to achieve this, in a preferred embodiment of the present invention, a watermark embedment strength λ and a noise visibility function (NVF) are respectively calculated for each position (i,j) of the $O\_LL_n$ subband according to the following Equations (1) and (2).

$$NVF(i, j) = \frac{\sigma_{max}^2}{\sigma_{max}^2 + \theta\sigma^2(i, j)} \quad (1)$$

$$\lambda(i, j) = S_e \cdot (1 - NVF(i, j)) + S_f \cdot NVF(i, j) \quad (2)$$

Herein, $\sigma^2(i,j)$ represents a local variance value for a peripheral region (for example, a 5×5 region) centering on the position (i,j), and $\sigma_{max}^2$ represents a maximum local variance value in the $O\_LL_n$ region, and $S_e$ and $S_f$ respectively represent embedment-strength controlling values previously determined for an edge region and a flat region of the image. Preferably, $S_e=15$, $S_f=5$ and $\theta=150$ values are set, but controlling can be appropriately made according to a request of the robustness and the invisibility.

As such, since the present invention appropriately sets the embedment strength using the variance value of the embedded position and the control values of the edge region and the flat region, etc., the robustness can be maintained against the external attack while the screen degradation caused by the watermark embedment can be minimized.

If the embedment strength is calculated for each position of the $LL_n$ subband, the Key 1 and Key 2 values are inputted from the user (S402). After the $LL_n$ subband is filtered to generate the $LL_n'$ subband (S403), the $LL_n$ coefficient value and the $LL_n'$ coefficient value are mutually compared with each other for each embedded position while the watermark is embedded using the embedment strength (S404).

Figure 5:
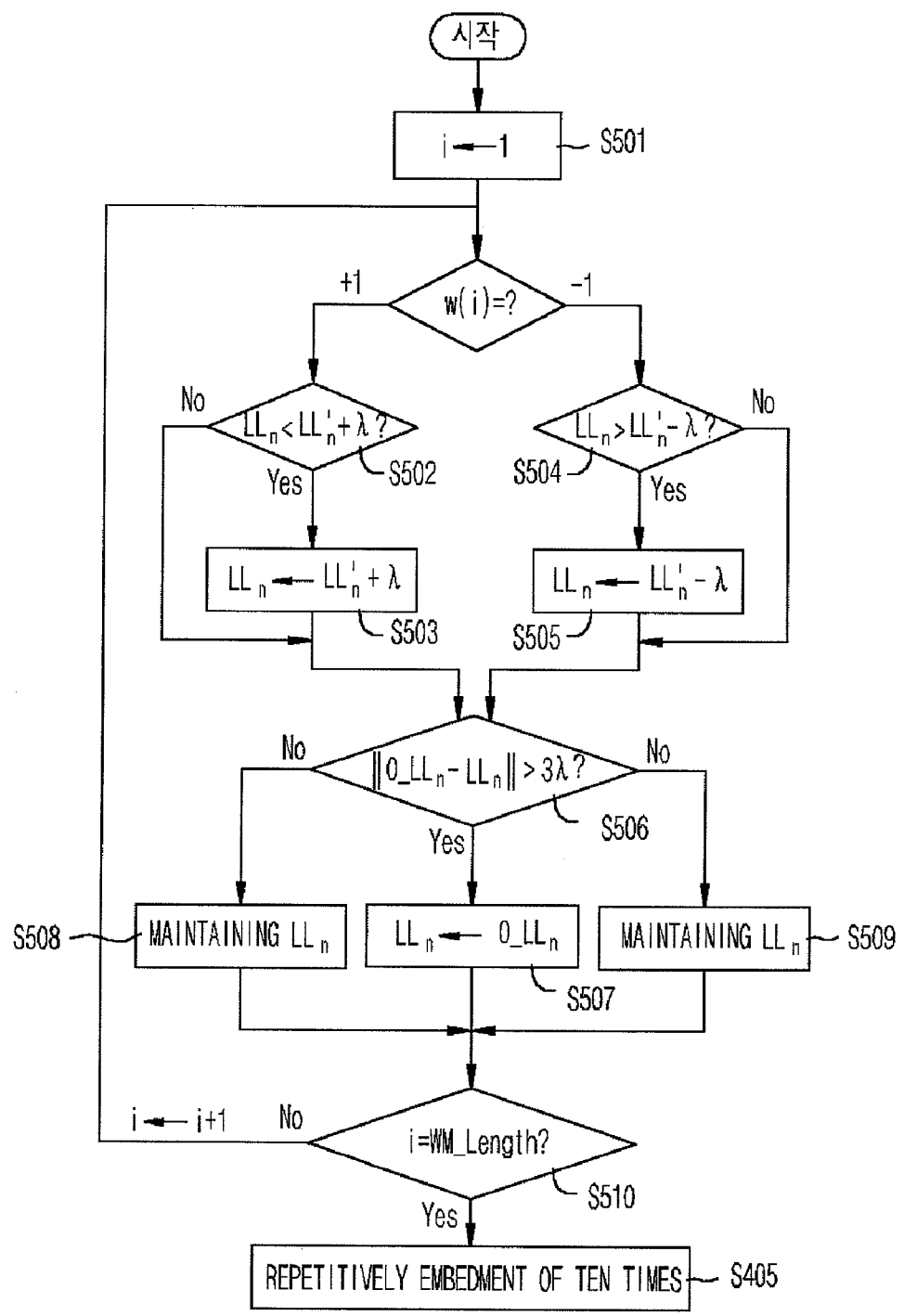
FIG. 5 is a view illustrating an algorithm processed in a watermark embedding part in accordance with the present invention.

More detailed algorithm and flow chart for the watermark embedding procedure are proposed by the following Equation (3) and FIG. 5.

$$\begin{aligned}
&\text{for } i = 1 : \text{wm\_length} \quad (3)\\
&\quad \text{if } (w(i) = = +1)\\
&\quad\quad \text{if } (LL_n(i) < LL_n'(i) + \lambda(i))\\
&\quad\quad\quad \text{New } LL_n(i) = LL_n'(i) + \lambda(i)\\
&\quad\quad \text{end}\\
&\quad \text{else if } (w(i) = = -1)\\
&\quad\quad \text{if } (LL_n(i) > LL_n'(i) - \lambda(i))\\
&\quad\quad\quad \text{New } LL_n(i) = LL_n'(i) - \lambda(i)\\
&\quad\quad \text{end}\\
&\quad \text{else if } (\|O\_LL_n(i) - LL_n(i)\| > 3\lambda(i))\\
&\quad\quad\quad \text{New } LL_n(i) = O\_LL_n(i)\\
&\quad \text{end}\\
&\text{end}
\end{aligned}$$

Referring to the Equation (3) and FIG. 5, firstly, the embedment sequence i is initially set to '1' (S501), the $LL_n$ coefficient value is altered for a first watermark embedded position to embed the watermark, and the embedment sequence i is increased by 1 while the coefficient value $LL_n(i)$ is sequentially altered for a total watermark sequence.

At this time, in case the watermark value W(i) for a corresponding embedded position i is '1', the $LL_n$ coefficient value $LL_n(i)$ is compared with the value $LL_n'(i)+\lambda(i)$ obtained by adding the embedment strength to the $LL_n'$ coefficient value (S502). As a comparative result, if the $LL_n(i)$ coefficient value is more than the $LL_n'(i)+\lambda(i)$ value, the $LL_n(i)$ coefficient value is maintained as it is, in case the $LL_n(i)$ coefficient value is less than the $LL_n'(i)+\lambda(i)$ value, the $LL_n(i)$ coefficient value is substituted for the $LL_n'(i)+\lambda(i)$ value to be maintained to be at an enough interval (above λ(i)) between the coefficient values (S503).

Herein, in comparison with the embedment strength λ(i,j) being a matrix expression for the position (i,j), the embedment strength λ(i) is an expression as the data sequence therefor.

To the contrary, in case the watermark value W(i) for the corresponding embedded position (i) is '−1', the $LL_n$ coefficient value $LL_n(i)$ is compared with a value $LL_n'(i)-\lambda(i)$ obtained by subtracting the embedment strength from the $LL_n'$ coefficient value (S504). As a comparative result, if the $LL_n(i)$ coefficient value is less than the $LL_n'(i)-\lambda(i)$ value, the $LL_n(i)$ coefficient value is maintained as it is, and if the $LL_n(i)$ coefficient value is more than the $LL_n'(i)-\lambda(i)$ value, the $LL_n(i)$ coefficient value is substituted for the $LL_n'(i)-\lambda(i)$ value such that the enough interval between the coefficient values is maintained (S505).

Further, after the $LL_n(i)$ coefficient value is altered depending on the '1' or '−1' watermark value as described above, in case the difference between the altered coefficient value and the initial $O\_LL_n(i)$ coefficient value of a corresponding position is more than three times $(3\lambda(i))$ of the embedment strength, since the watermark embedment represents that the screen degradation is increased, the initial $O\_LL_n(i)$ coefficient value is maintained for the corresponding position, that is, the watermark embedment is skipped to thereby prevent the screen degradation (S506 to S509).

The above watermark embedding-skipping can cause a little error at the time of extracting the watermark $W(i)$, however, since the watermark embedding-skipping is merely a minority among a total embedment sequence, it can be determined by a similarity determination in an extraction procedure to be the same watermark.

In the present invention, after i is sequentially increased as described above while the watermark sequence $W(i)$ is embedded one time for each embedded position (S510), this procedure is repetitively performed at predetermined times to repetitively embed the watermark sequence (S405).

In other words, the altered $LL_n$ coefficient value obtained by embedding the watermark sequence one time is again fedback to the Wiener filter 310 to obtain the $LL_n'$ coefficient value, and the watermark sequence is repetitively embedded according to the steps S501 to S502 every embedded position to output the watermarked DC region $(LL_{nE})$ (S406).

There is a characteristic in which as embedment times is increasingly repeated, the robustness is generally increased, but the screen quality is deteriorated. In other words, as the repetitive times is increased, the interval between the outputted $LL_{nE}(i)$ coefficient value and the initial $O\_LL_n$ coefficient value is gradually increased and saturated at above predetermined times to be maintained at the predetermined interval.

Accordingly, those having ordinary skill in the art need to set appropriate repetitive times considering a desired robustness and screen degradation, and in the preferred embodiment of the present invention, the repetitive embedment is executed about 10 times that does not almost cause the $LL_{nE}(i)$ coefficient value to alter due to the repetitive times.

Figure 6:
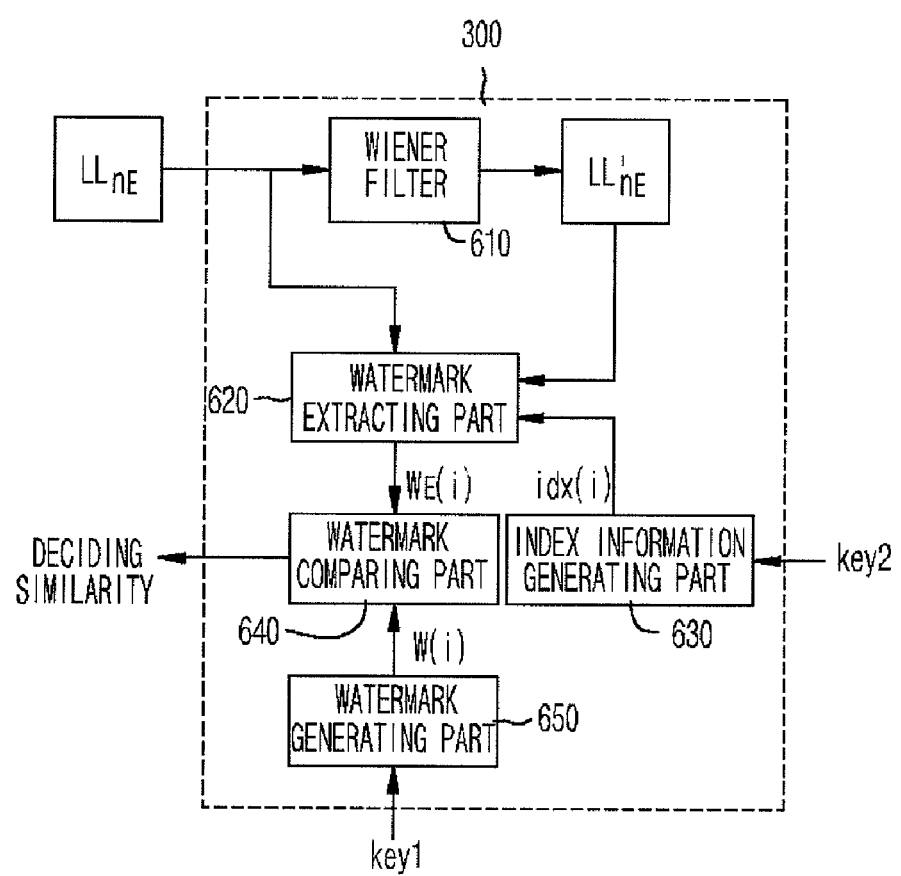
FIG. 6 is a block diagram illustrating a watermark extracting device in accordance with the present invention.

FIG. 6 is a block diagram illustrating a watermark extracting device 600 in accordance with the present invention.

Describing the watermark extracting procedure according with the present invention with reference to FIG. 6, firstly, the image having the watermark embedded therein is wavelet-decomposed into the same n-level as that of the time of embedment to extract the $LL_{nE}$ subband being the lowest subband.

Additionally, the $LL_{nE}'$ coefficient value is obtained by eliminating the high frequency component from the $LL_{nE}$ subband through the Wiener filter 610, and the coefficient value of the $LL_{nE}$ subband and the $LL_{nE}$ coefficient value are inputted to the watermark extracting part 620.

Further, the index information generating part 630 generates the index information $idx(i)$ depending on the Key 2 value inputted by the user to inform the watermark extracting part 620 of the watermark extracted position within the $LL_{nE}$ subband.

Accordingly, the watermark extracting part 620 mutually compares the $LL_{nE}(i)$ coefficient value with the $LL_{nE}'(i)$ coefficient value for each extracted position to extract the embedded watermark sequence $W_E(i)$ according to the following equation (4).

$$W_E(i)=-1, \text{ if } LL_{nE}<LL'_{nE} \quad (4)$$

$$W_E(i)=+1, \text{ otherwise}$$

In other words, in case the $LL_{nE}(i)$ coefficient value is less than the $LL_{nE}'(i)$ coefficient value, the watermark '−1' is extracted, and in the contrary case, the watermark '+1' is extracted.

Further, the watermark generating part 650 generates the watermark sequence $W(i)$ of the time of embedment according to the Key 1 value inputted by the user to transmit the generated watermark sequence $W(i)$ to a watermark comparing part 640.

Accordingly, the watermark comparing part 640 determines a similarity between two watermark data sequences by a correlation value operation between the extracted watermark sequence $W_E(i)$ and the originally embedded watermark sequence $W(i)$, and if the similarity is more than a critical value, it is determined that the watermark exists.

As described above, the embedding and extracting method of digital watermark on the lowest wavelet subband can solve a trade-off drawback between the robustness of the low frequency subband watermarking and the screen degradation and can usefully be used in the correlation-based watermarking method, by providing the algorithm in which a high quality screen can be maintained in the low frequency subband providing the robustness while the watermark can be embedded.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of embedding a digital watermark on a wavelet lowest subband of an original image, the method comprising the steps of:

wavelet transforming the original image into n levels;

setting the wavelet lowest subband of the wavelet-transformed original image as a watermark embedment region;

high-frequency filtering an original picture $LL_n$ of the watermark embedment region to generate a mirror picture $LL_n'$ from which a high frequency component of the original picture $LL_n$ has been eliminated;

generating (i) index information designating a plurality of pixel positions within the watermark embedment region where the watermark is to be embedded, and (ii) a sequence of watermark values to be embedded in said pixel positions, respectively;

calculating an embedment strength $\lambda$ for each said pixel position of the watermark embedment region, considering a variance degree of an original picture $LL_n$ coefficient value;

for each said pixel position, selectively altering the original picture $LL_n$ coefficient value based on (a) a corresponding mirror picture $LL_n'$ coefficient value, (b) the watermark value to be embedded in said pixel position, and (c) the embedment strength $\lambda$ of said pixel position; and selectively embedding the watermark at each said pixel position with the selectively altered original picture $LL_n$ coefficient value while skipping watermark embedment where the original picture $LL_n$ coefficient value before and after said altering differs by more than a predetermined value associated with the corresponding embedment strength $\lambda$.

2. The method of claim 1, wherein in the step of high frequency filtering, the high-frequency component is eliminated though Wiener filtering.

3. The method of claim 1, wherein in the embedment strength calculating step, the embedment strength $\lambda$ in every said pixel position in the watermark embedment region is calculated according to the following Equations (1) and (2):

$$NVF(i, j) = \frac{\sigma_{max}^2}{\sigma_{max}^2 + \theta\sigma^2(i, j)} \quad (1)$$

$$\lambda(i, j) = S_e \cdot (1 - NVF(i, j)) + S_f \cdot NVF(i, j) \quad (2)$$

$\sigma^2(i, j)$: a local variance value for a peripheral region centering on the position (i,j);

$\sigma^2_{max}$: a maximum local variance value in the watermark embedment region;

$S_e$, $S_f$ and $\theta$: embedment strength controlling values.

4. The method of claim 1, wherein, in the step of selectively altering the original picture $LL_n$ coefficient value, if the watermark value '1' is to be embedded in a corresponding pixel position i, the original picture coefficient value $LL_n(i)$ is compared with an added value $LL_n'(i)+\lambda(i)$ obtained by adding the embedment strength to the mirror picture coefficient value and if the original picture coefficient value is greater than the added value, the original picture coefficient value is maintained as is, and if the original picture coefficient value is less than the added value, the original picture coefficient value of the pixel position is assigned the added value.

5. The method of claim 1, wherein, in the step of selectively altering the original picture $LL_n$ coefficient value if the watermark value '−1' is to be embedded in a corresponding pixel position i, the original picture coefficient value $LL_n(i)$ is compared with a subtracted value $LL_n'(i)-\lambda(i)$ obtained by subtracting the embedment strength from the mirror picture coefficient value and if the original picture coefficient value is less than the subtracted value, the original picture coefficient value is maintained as is, and if the original picture coefficient value is greater than the subtracted value, the original picture coefficient value is assigned the subtracted value.

6. The method of claim 1, wherein the initial original picture efficient value is maintained to skip the watermark embedment at each pixel position where the original picture LLn coefficient value before and after said altering differs by more than thee times the embedment strength.

7. The method of claim 1, wherein the watermark is repetitively embedded in each pixel position a predetermined number of times depending on robustness and screen degradation degree.

8. A watermark extracting method of extracting a watermark embedded by the method of claim 1 from a watermark embedded image, the watermark extracting method comprising the steps of:

wavelet transforming the watermark embedded image into the same n levels;

defining a wavelet lowest subband of the wavelet-transformed watermark embedded image as a watermark extracted region;

high-frequency filtering an original picture $LL_{nE}$ of the watermark extracted region to generate a mirror picture $LL_n'$ from which a high frequency component of the original picture $LL_{nE}$ has been eliminated;

receiving index information designating a plurality of pixel positions within the watermark extracted region where the watermark has been embedded;

comparing an original picture $LL_{nE}$ coefficient value with a mirror picture $LL_{nE}'$ coefficient value at each said pixel position to extract a sequence $W_E(i)$ of watermark values;

receiving a key value to regenerate an original sequence $W(i)$ of watermark values used at the time of watermark embedment; and determining a similarity between the extracted watermark sequence and the original watermark sequence, and judging whether or not the watermark exists depending on whether or not the similarity is greater than a predetermined critical value.

9. The method of claim 8, wherein, in the watermark extracting step, if the original picture $LL_{nE}$ coefficient value is less than the mirror picture $LL_{nE}'$ coefficient value, a watermark value '−1' is extracted from the respective pixel position;

otherwise, a watermark value '+1' is extracted.

* * * * *